(12) United States Patent
Kim et al.

(10) Patent No.: US 10,957,932 B2
(45) Date of Patent: Mar. 23, 2021

(54) ELECTROLYTE FOR SOLID OXIDE FUEL CELL, SOLID OXIDE FUEL CELL COMPRISING SAME, COMPOSITION FOR SAID ELECTROLYTE, AND METHOD FOR PRODUCING SAID ELECTROLYTE

(71) Applicant: LG CHEM, LTD., Seoul (KR)

(72) Inventors: Jong Woo Kim, Daejeon (KR); Doohyun Baek, Daejeon (KR); Changseok Ryoo, Daejeon (KR); Bu Won Son, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 149 days.

(21) Appl. No.: 16/099,622

(22) PCT Filed: Aug. 24, 2017

(86) PCT No.: PCT/KR2017/009262
§ 371 (c)(1),
(2) Date: Nov. 7, 2018

(87) PCT Pub. No.: WO2018/062694
PCT Pub. Date: Apr. 5, 2018

(65) Prior Publication Data
US 2019/0123374 A1    Apr. 25, 2019

(30) Foreign Application Priority Data
Sep. 30, 2016  (KR) .......................... 10-2016-0126726

(51) Int. Cl.
*H01M 8/124*    (2016.01)
*H01M 8/1246*   (2016.01)
(Continued)

(52) U.S. Cl.
CPC ........... *H01M 8/1246* (2013.01); *B32B 18/00* (2013.01); *C04B 35/01* (2013.01); *C04B 35/26* (2013.01);
(Continued)

(58) Field of Classification Search
None
See application file for complete search history.

(56) References Cited

U.S. PATENT DOCUMENTS

2003/0100428 A1 * 5/2003 Kim .................... C04B 35/462
501/32
2008/0102337 A1    5/2008 Shimada
(Continued)

FOREIGN PATENT DOCUMENTS

JP    2003-123789 A    4/2003
JP    2015-220012 A   12/2015
(Continued)

OTHER PUBLICATIONS

International Search Report issued in PCT/KR2017/009262 (PCT/ISA/210), dated Nov. 30, 2017.
(Continued)

*Primary Examiner* — Jeremiah R Smith
(74) *Attorney, Agent, or Firm* — Birch, Stewart, Kolasch & Birch, LLP

(57) ABSTRACT

The present specification relates to an electrolyte of a solid oxide fuel cell, a solid oxide fuel cell including the same, a composition for the electrolyte, and a method for preparing the electrolyte.

8 Claims, 11 Drawing Sheets

(51) Int. Cl.
*C04B 35/01* (2006.01)
*B32B 18/00* (2006.01)
*C04B 35/26* (2006.01)
*C04B 35/50* (2006.01)
*C04B 35/488* (2006.01)
*C04B 111/00* (2006.01)
*H01M 8/1004* (2016.01)

(52) U.S. Cl.
CPC ............ *C04B 35/488* (2013.01); *C04B 35/50* (2013.01); *H01M 8/124* (2013.01); *C04B 2111/00405* (2013.01); *C04B 2235/3201* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/3246* (2013.01); *C04B 2235/3262* (2013.01); *C04B 2235/3272* (2013.01); *C04B 2235/3275* (2013.01); *C04B 2235/3279* (2013.01); *C04B 2235/3284* (2013.01); *C04B 2235/3286* (2013.01); *C04B 2235/3409* (2013.01); *C04B 2235/3418* (2013.01); *C04B 2235/365* (2013.01); *C04B 2235/5445* (2013.01); *H01M 8/1004* (2013.01); *H01M 2008/1293* (2013.01); *H01M 2250/10* (2013.01); *H01M 2250/20* (2013.01); *H01M 2300/0077* (2013.01); *Y02P 70/50* (2015.11)

(56) References Cited

U.S. PATENT DOCUMENTS

| | | | | |
|---|---|---|---|---|
| 2011/0165482 | A1* | 7/2011 | Chartier | C04B 38/062 429/422 |
| 2011/0183233 | A1* | 7/2011 | Armstrong | H01M 8/1246 429/482 |
| 2012/0003565 | A1 | 1/2012 | Son et al. | |
| 2012/0251917 | A1 | 10/2012 | Son et al. | |
| 2013/0136981 | A1* | 5/2013 | Peuchert | H01M 10/0525 429/188 |
| 2014/0179508 | A1* | 6/2014 | Park | H01B 3/12 501/18 |
| 2016/0039711 | A1* | 2/2016 | Miyazaki | C03C 4/14 361/301.4 |
| 2016/0164114 | A1* | 6/2016 | Kim | H01M 4/8889 429/482 |
| 2017/0237103 | A1 | 8/2017 | Choi et al. | |
| 2018/0019493 | A1* | 1/2018 | Jakus | B33Y 40/00 |

FOREIGN PATENT DOCUMENTS

| | | |
|---|---|---|
| KR | 2004-520255 A | 7/2004 |
| KR | 10-2007-0011943 A | 1/2007 |
| KR | 2007-242429 A | 9/2007 |
| KR | 10-2010-0104153 A | 9/2010 |
| KR | 10-2013-0057205 A | 5/2013 |
| KR | 10-1374868 B1 | 3/2014 |
| KR | 10-2014-0046714 A | 4/2014 |
| KR | 10-1466974 B1 | 11/2014 |
| KR | 10-2015-0016118 A | 2/2015 |
| KR | 4011771 B2 | 12/2015 |
| KR | 10-2016-0053832 A | 5/2016 |
| KR | 10-2016-0059419 A | 5/2016 |

OTHER PUBLICATIONS

European Search Report for Appl. No. 17856580.0, dated Apr. 5, 2019.

Junliang, L., et al, "Modeling investigation of gradient electrolyte films deposited via convection-diffusion on porous electrode substrates," Journal of Power Sources, Dec. 14, 2007, vol. 178, No. 1, pp. 309-315.

Wei, H., et al., "Preparation of $Sm_xCe_{1-x}O_2$ (SDC) electrolyte film with gradient structure via a gas-phase controlling convection-diffusion approach on porous substrate," Advances in Colloid and Interface Science, Dec. 15, 2010, vol. 161, No. 1-2, pp. 181-194.

* cited by examiner

[Figure 1]
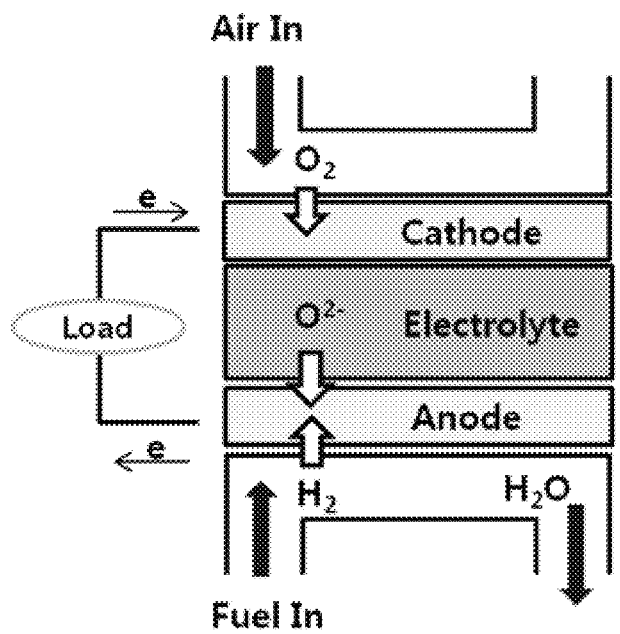
[Figure 2]
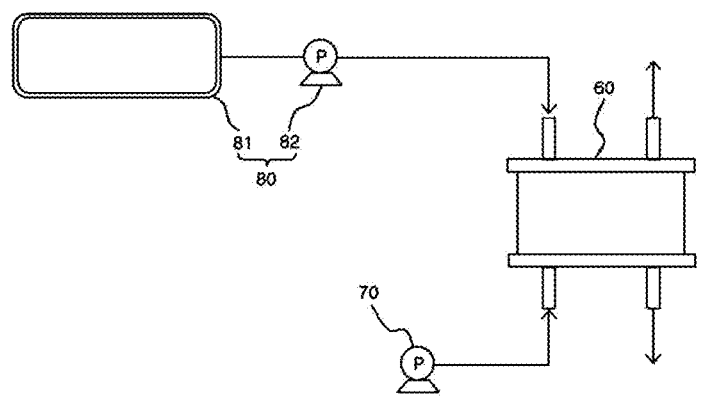

[Figure 3]
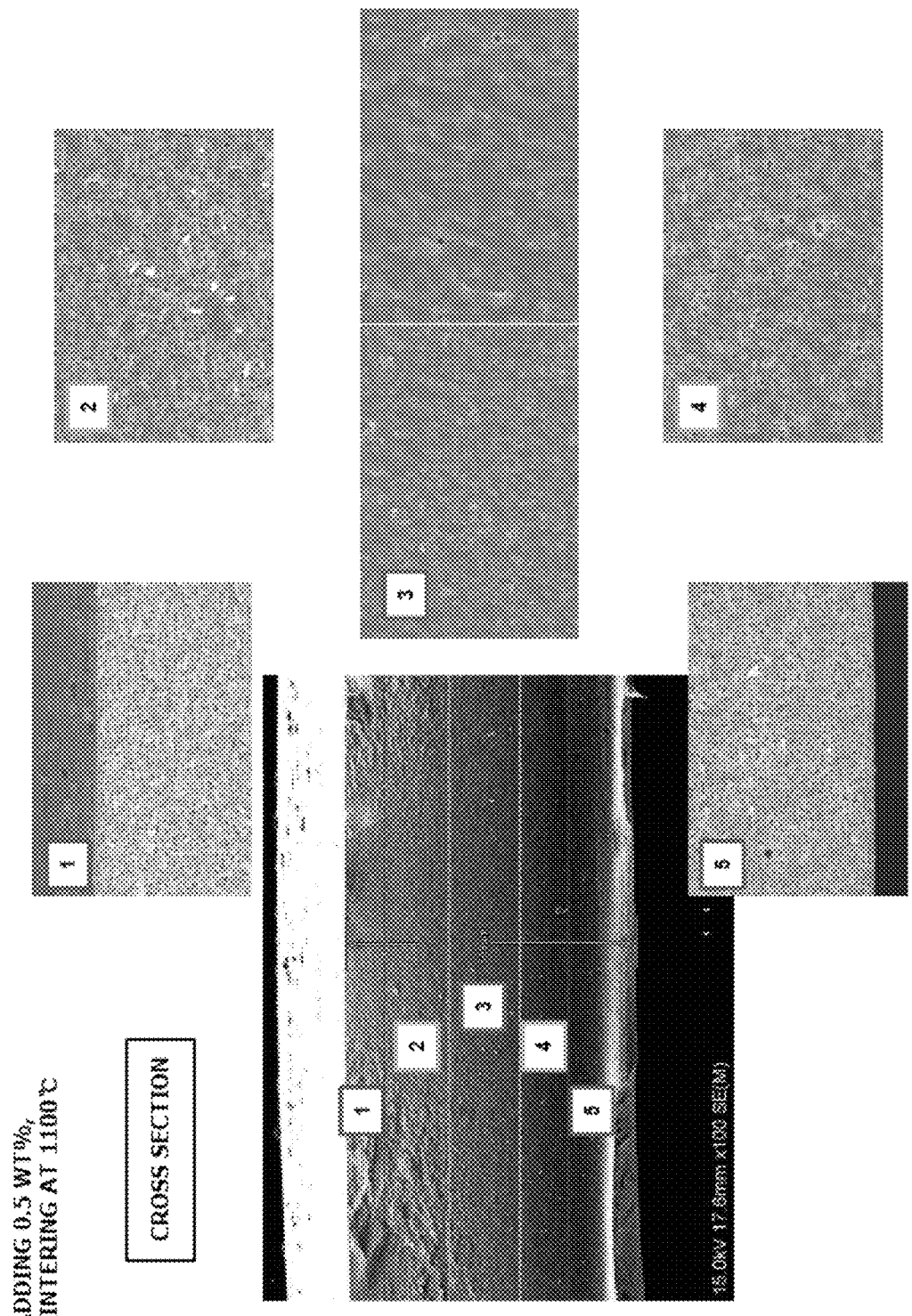
ADDING 0.5 WT%O₂
SINTERING AT 1100℃

[Figure 4]
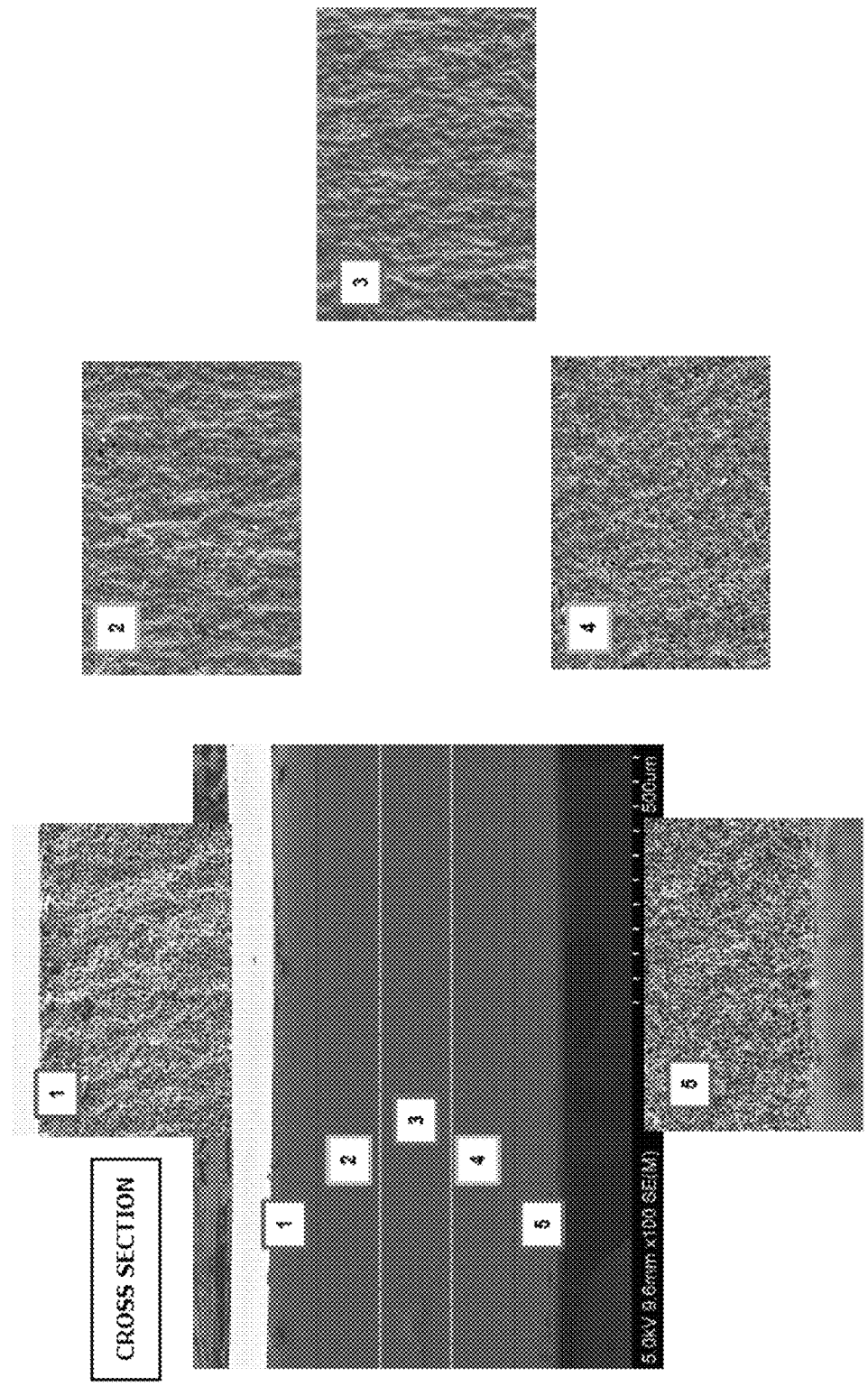

[Figure 5]
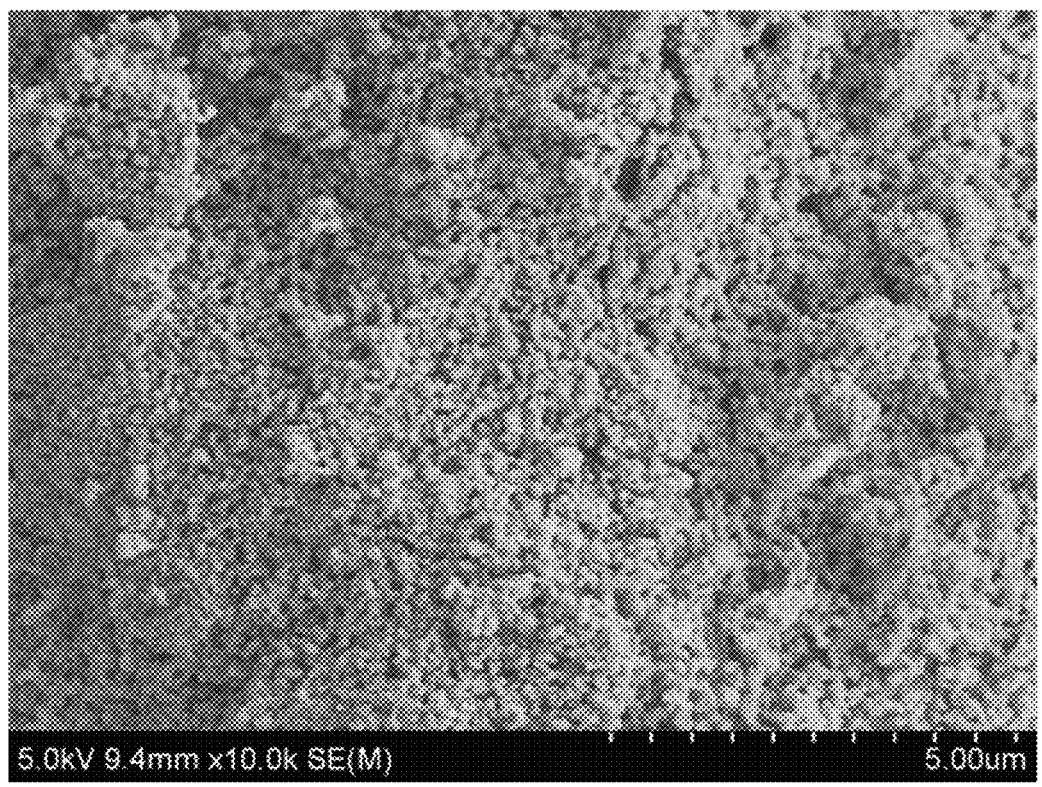

[Figure 6]
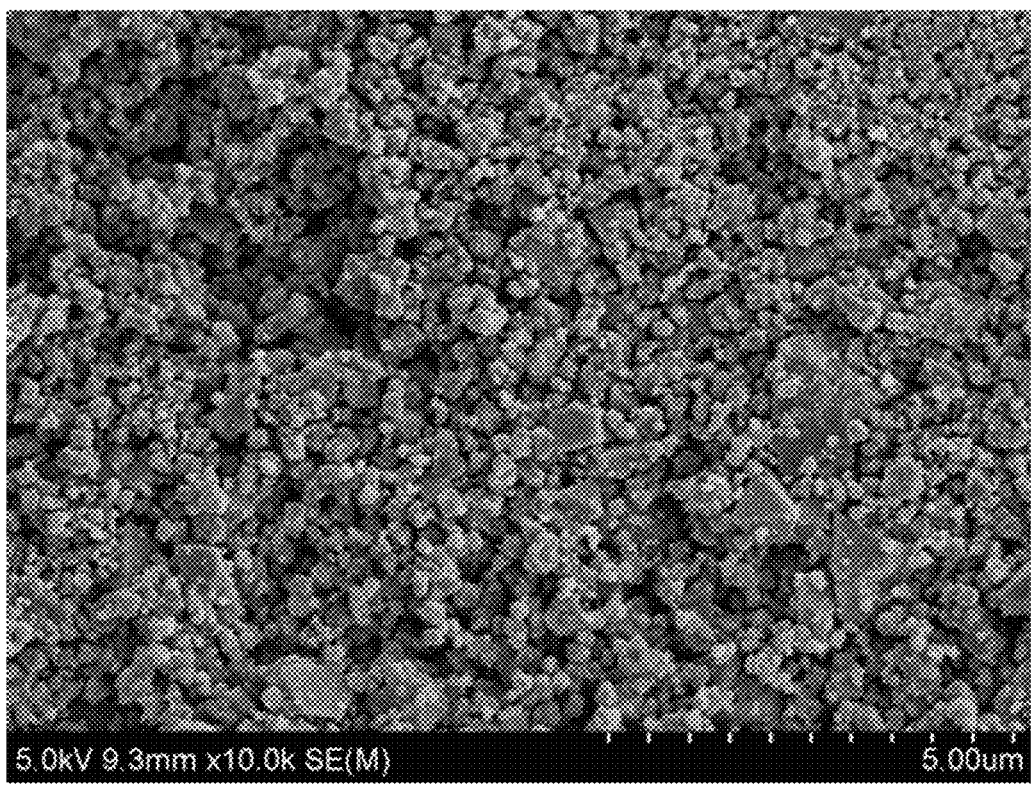

[Figure 7]
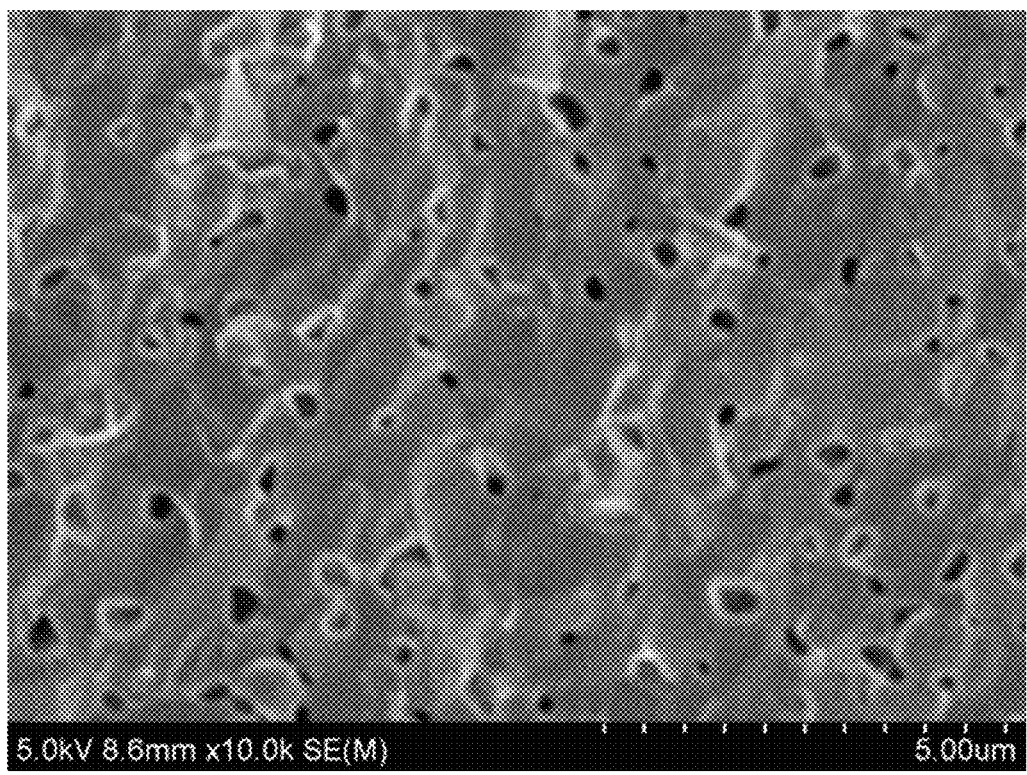

[Figure 8]
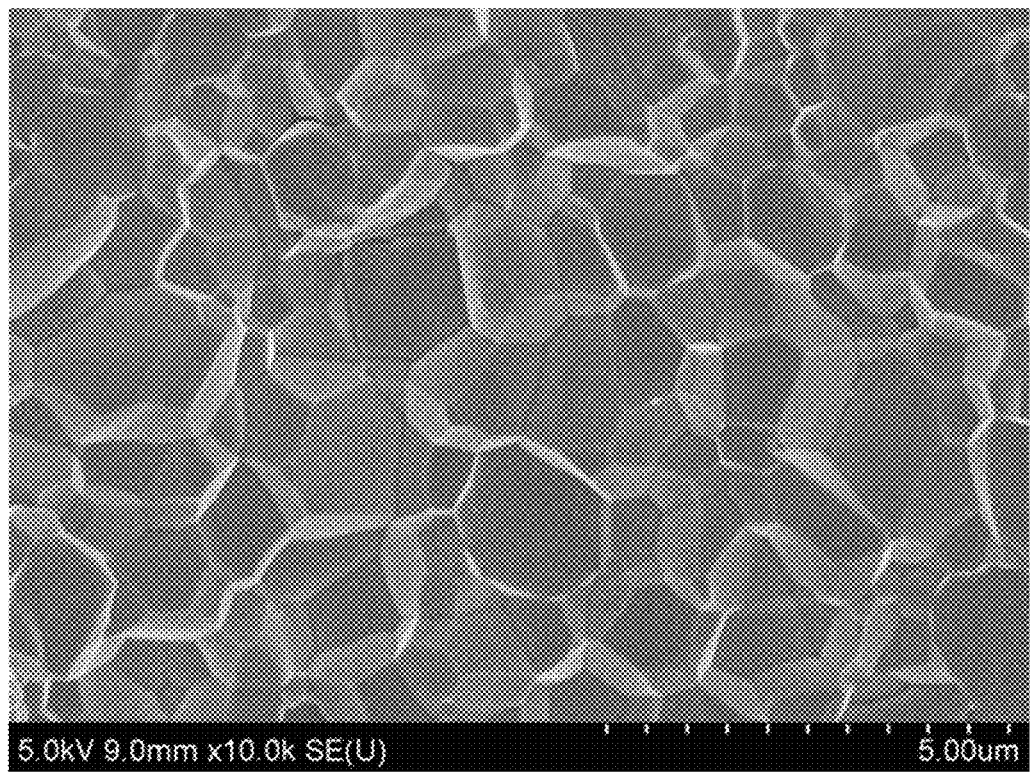

[Figure 9]
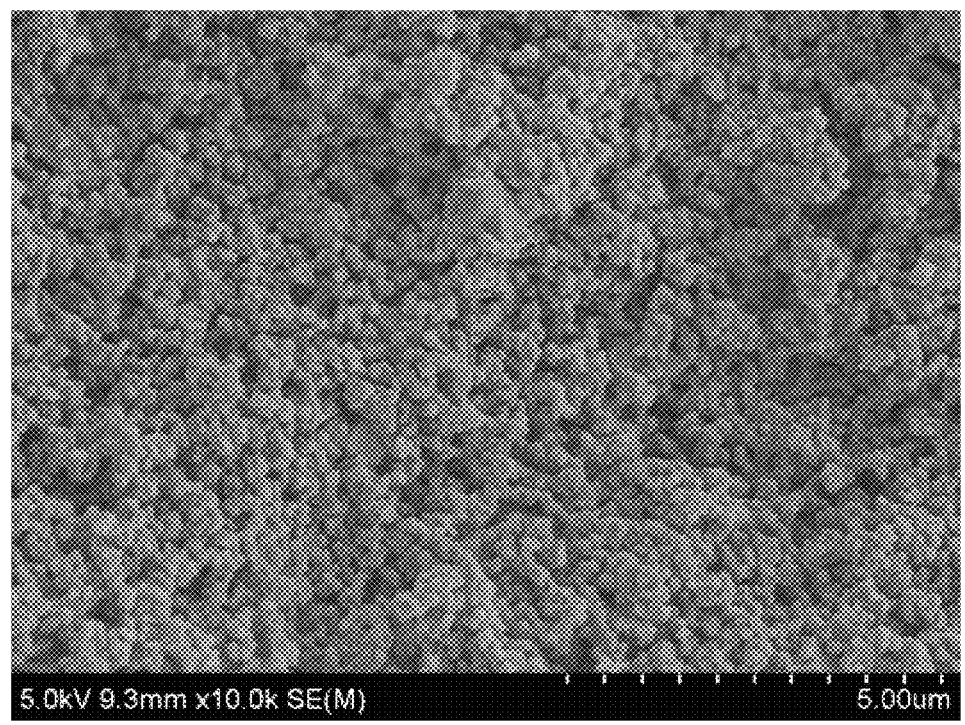

[Figure 10]
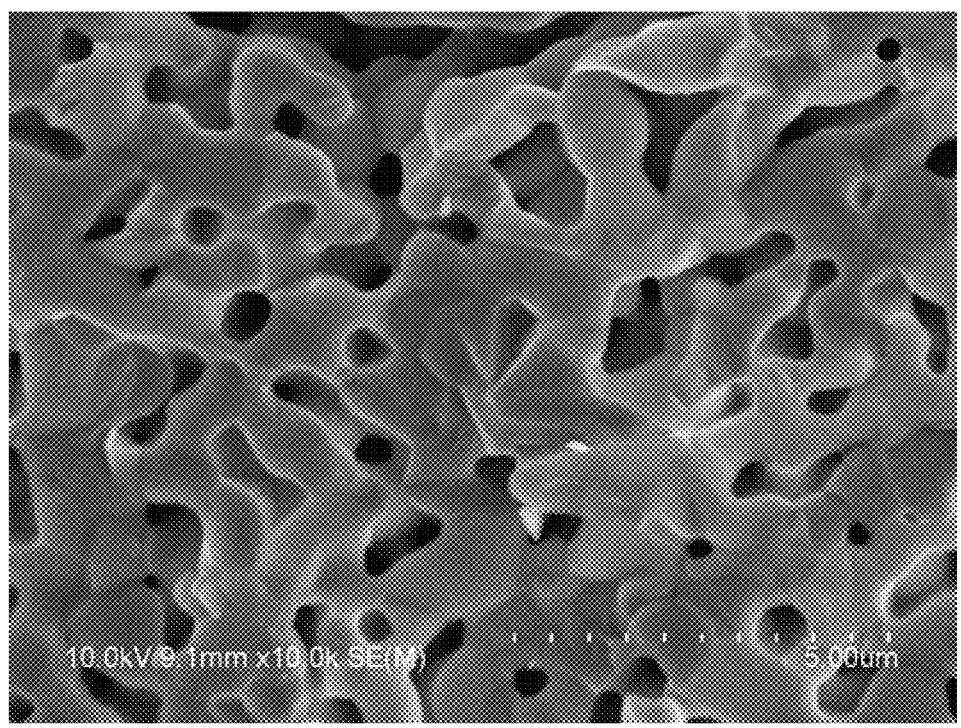

[Figure 11]
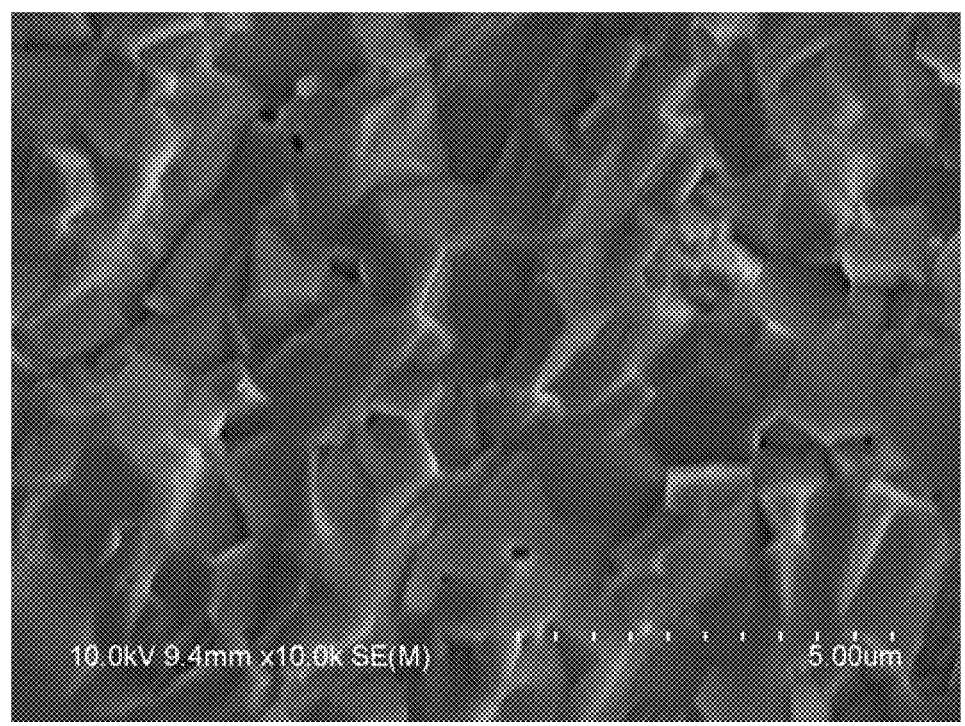

[Figure 12]
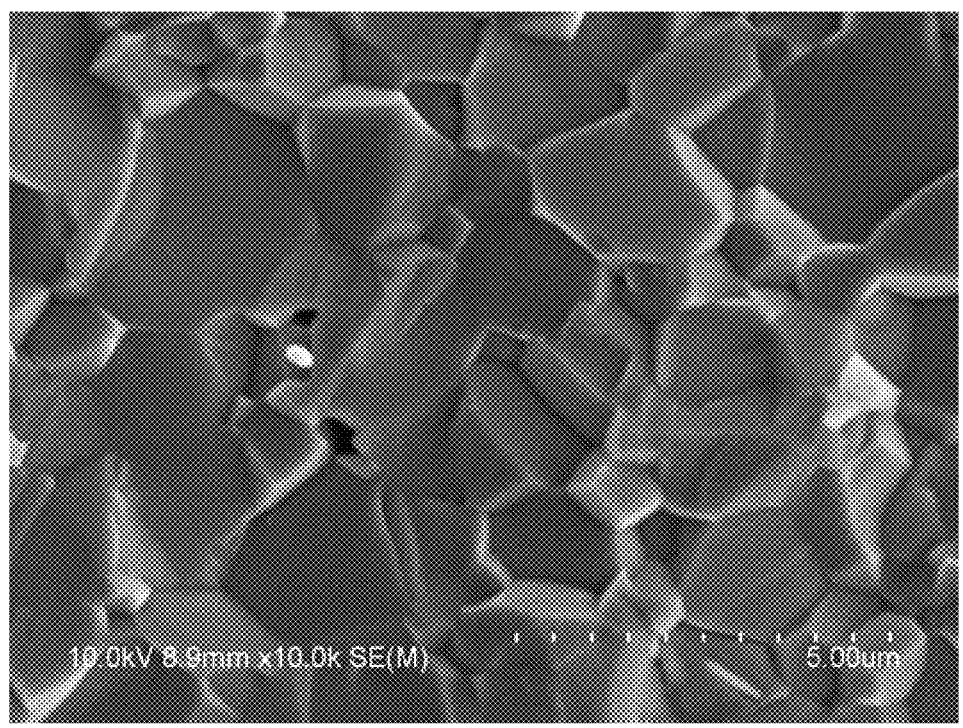

ELECTROLYTE FOR SOLID OXIDE FUEL CELL, SOLID OXIDE FUEL CELL COMPRISING SAME, COMPOSITION FOR SAID ELECTROLYTE, AND METHOD FOR PRODUCING SAID ELECTROLYTE

TECHNICAL FIELD

This application claims priority to and the benefit of Korean Patent Application No. 10-2016-0126726 filed in the Korean Intellectual Property Office on Sep. 30, 2016, the entire contents of which are incorporated herein by reference.

The present specification relates to an electrolyte of a solid oxide fuel cell, a solid oxide fuel cell including the same, a composition for the electrolyte, and a method for preparing the electrolyte.

BACKGROUND ART

Recently, depletion of existing energy sources such as oil and coal has been predicted, and interest in energy that can replace the energy is increasing. A fuel cell as one of the alternative energy has particularly received attention due to high efficiency and merits such that pollutants such as NOx and SOx are not discharged and the used fuel is abundant.

The fuel cell is a power generation system that converts chemical reaction energy of the fuel and an oxidizer into electric energy, and hydrogen and hydrocarbons such as methanol and butane as the fuel and oxygen as the oxidizer are representatively used.

The fuel cell includes a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC), and the like.

Meanwhile, research on a metal air secondary battery that manufactures a cathode of the metal secondary battery as an air electrode by applying a principle of the air electrode of the fuel cell is required.

DETAILED DESCRIPTION OF THE INVENTION

Technical Problem

The present specification has been made in an effort to provide an electrolyte of a solid oxide fuel cell, a solid oxide fuel cell including the same, a composition for the electrolyte, and a method for preparing the electrolyte.

Technical Solution

An exemplary embodiment of the present specification provides an electrolyte of a solid oxide fuel cell in which pores gradually increase to both sides from a middle portion in a thickness direction.

Another exemplary embodiment of the present specification provides a solid oxide fuel cell including an anode, a cathode, and an electrolyte provided between the anode and the cathode.

Still another exemplary embodiment of the present specification provides an electrolyte composition of the solid oxide fuel cell, including oxygen ion conductive inorganic particles and a sintering agent, in which based on the total weight of the composition, the content of the sintering agent is 0.2 wt % or more and less than 5 wt %.

Yet another exemplary embodiment of the present specification provides a method for preparing an electrolyte of a solid oxide fuel cell including: forming a membrane by coating a composition; drying the membrane; and sintering the membrane.

Advantageous Effects

According to the present specification, it is possible to obtain a SOFC electrolyte having a symmetric pore structure of which porosity increases toward both surfaces from the middle by one sintering process.

BRIEF DESCRIPTION OF DRAWINGS

FIG. 1 is a schematic diagram illustrating a principle of electricity generation of a solid oxide fuel cell.

FIG. 2 is a diagram schematically illustrating an example of a battery module including a fuel cell.

FIG. 3 is a scanning electron microscope (SEM) image for a vertical cross section of an electrolyte support in Example 1.

FIG. 4 is an SEM image for a vertical cross section of an electrolyte support in Example 2.

FIG. 5 is an SEM image for a vertical cross section of an electrolyte support in Comparative Example 1.

FIG. 6 is an SEM image for a vertical cross section of an electrolyte support in Comparative Example 2.

FIG. 7 is an SEM image for a vertical cross section of an electrolyte support in Comparative Example 3.

FIG. 8 is an SEM image for a vertical cross section of an electrolyte support in Comparative Example 4.

FIG. 9 is an SEM image for a vertical cross section of an electrolyte support in Comparative Example 5.

FIG. 10 is an SEM image for a vertical cross section of an electrolyte support in Comparative Example 6.

FIG. 11 is an SEM image for a vertical cross section of an electrolyte support in Comparative Example 7.

FIG. 12 is an SEM image for a vertical cross section of an electrolyte support in Comparative Example 8.

EXPLANATION OF REFERENCE NUMERALS AND SYMBOLS

60: Battery module
70: Oxidizer supply unit
80: Fuel supply unit
81: Fuel tank
82: Pump

BEST MODE

Hereinafter, the present specification will be described in detail.

The present specification provides an electrolyte of a solid oxide fuel cell in which pores gradually increase toward both surfaces from a middle portion in a thickness direction.

The porosity of the middle portion of the electrolyte may be lower than the porosity of both surfaces of the electrolyte by 20% or more. On the other hand, the porosity of both surfaces of the electrolyte may be higher than the porosity of the middle portion of the electrolyte by 20% or more.

The porosity of the middle portion of the electrolyte may be less than 0.1%. In this case, the porosity of both surfaces of the electrolyte may be higher than the porosity of the middle portion of the electrolyte by 20% or more and particularly, the porosity of both surfaces of the electrolyte may be 23% or more, respectively.

The porosity of both surfaces of the electrolyte may be 25% or more, respectively. In this case, there is an advantage that a three-phase interface of oxygen/cathode/electrolyte may be increased by maximizing a loading amount of a cathode active material. In this case, the porosity of the middle portion of the electrolyte may be lower than the porosity of both surfaces of the electrolyte by 20% or more and particularly, the porosity of the middle portion of the electrolyte may be 0.1% or less.

The porosity of both surfaces of the electrolyte may be 20% or more and 25% or less, and particularly, may be 21% or more and 23% or less.

The porosity of the middle portion of the electrolyte may be less than 0.1% and the porosity of both surfaces of the electrolyte may be 20% or more. In this case, it is possible to manufacture a solid electrolyte fuel cell which comprises the electrolyte having a high oxygen ion conductivity characteristic toward the middle portion and a high electric conductivity characteristic toward the both surfaces.

The average thickness of the electrolyte may be 500 μm or more and 1000 μm or less, particularly 300 μm or more and 600 μm or less.

The electrolyte may include an inorganic material having oxygen ion conductivity. The kind of inorganic material is not particularly limited, but the inorganic material may include at least one of yttria stabilized zirconia (YSZ; $(Y_2O_3)_x(ZrO_2)_{1-x}$, x=0.05 to 0.15), scandia stabilized zirconia (ScSZ; $(Sc_2O_3)_x(ZrO_2)_{1-x}$, x=0.05 to 0.15), samarium dope ceria (SDC; $(Sm_2O_3)_x(CeO_2)_{1-x}$, x=0.02 to 0.4), gadolinium dope ceria (GDC; $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

The electrolyte may be a layer that serves as a support in a solid oxide fuel cell. In other words, the electrolyte may be an electrolyte support, in which the electrolyte in the solid oxide fuel cell is a layer that is relatively thicker than another layer and physically supports the adjacent layer.

The present specification provides a solid oxide fuel cell including an anode, a cathode, and an electrolyte provided between the anode and the cathode according to the present specification.

FIG. 1 schematically illustrates a principle of electricity generation of a solid oxide fuel cell. The solid oxide fuel cell includes an electrolyte layer and a fuel electrode (anode) and an air electrode (cathode) formed on both surfaces of the electrolyte layer. Referring to FIG. 1 illustrating the principle of electricity generation of the solid oxide fuel cell, air is electrochemically reduced at the cathode to generate oxygen ions, and the produced oxygen ions are transferred to the anode through the electrolyte layer. In the anode, fuel such as hydrogen, methanol, butane and the like is injected and the fuel is combined with the oxygen ions and electrochemically oxidized to emit electrons and generate water. This reaction causes electron transfer to an external circuit.

The anode may include an inorganic material having oxygen ion conductivity so as to be applicable to the anode for the solid oxide fuel cell. The kind of organic material is not particularly limited, but the inorganic material may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15)), samarium doped ceria (SDC: $(Sm_2O_3)_x(CeO_2)_{1-x}$, x=0.02 to 0.4), and gadolinium doped ceria (GDC: $(Gd_2O_3)_x(CeO_2)_{1-x}$, x=0.02 to 0.4).

A thickness of the anode may be 10 μm or more and 100 μm or less. Particularly, the thickness of the anode may be 20 μm or more and 50 μm or less.

The porosity of the anode may be 10% or more and 30% or less. Particularly, the porosity of the anode may be 10% or more and 23% or less.

A diameter of a pore of the anode may be 0.1 μm or more and 10 μm or less. Particularly, the diameter of the pore of the anode may be 0.5 μm or more and 5 μm or less. More particularly, the diameter of the anode may be 0.5 μm or more and 2 μm or less.

In a method for forming the anode on one surface of the electrolyte according to a first embodiment, the anode may be prepared by coating anode slurry on one surface of the electrolyte, and drying and firing the anode slurry.

The anode slurry includes inorganic particles having oxygen ion conductivity, and if necessary, the anode slurry may further include at least one of a binder resin, a plasticizer, a dispersant, and a solvent. The binder resin, the plasticizer, the dispersant and the solvent are not particularly limited, and typical materials known in the art can be used.

Based on the total weight of the anode slurry, the content of the inorganic particle having oxygen ion conductivity may be 10 wt % or more and 40 wt % or less, the content of the solvent may be 10 wt % or more and 30 wt % or less, the content of the dispersant may be 5 wt % or more and 10 wt % or less, the content of the plasticizer content may be 0.5 wt % or more and 3 wt % or less, and the content of the binder may be 10 wt % or more and 30 wt % or less.

The anode slurry may further include NiO. The content of the NiO may be 30 wt % or more and 60 wt % or less based on the total weight of the anode slurry.

In a method for forming an anode on one surface of the electrolyte according to a second embodiment, the anode may be formed on the electrolyte by infiltrating a precursor solution containing a precursor for synthesizing inorganic particles having oxygen ion conductivity into one porous surface of the electrolyte by a vacuum solution infiltration method.

For example, the anode may be formed on the electrolyte by infiltrating a precursor solution containing $Ni(NO_3)_2 \cdot 6H_2O$ and $Ce(NO_3) \cdot 6H_2O$ into one porous surface of the electrolyte by a vacuum solution infiltration method using vacuum and then firing. In this case, the firing temperature may be about 1100° C. In this case, the precursor solution may further include a Gd precursor or a Sm precursor.

In a method for forming an anode on one surface of the electrolyte according to a third embodiment, the anode may be formed on the electrolyte by infiltrating an anode composition into one porous surface of the electrolyte by a vacuum solution infiltration method. The anode composition includes inorganic particles which have oxygen ion conductivity, and has viscosity of 1000 cps or less which is infiltratable into one surface of the porous electrolyte.

The components of the anode composition are the same as or different from those of the anode slurry, and although the components are the same as each other, the content of the solvent is increased in order to lower the viscosity and the contents of the components may be different from each other.

Herein, the vacuum solution infiltration method is a method capable of evenly infiltrating a solution having low viscosity into the porous structure.

The cathode may include an inorganic material having oxygen ion conductivity so as to be applicable to the cathode for the solid oxide fuel cell. The kind of inorganic material is not particularly limited, but the inorganic material may include at least one of yttria stabilized zirconia (YSZ; $(Y_2O_3)_x(ZrO_2)_{1-x}$, x=0.05 to 0.15), scandia stabilized zirconia (ScSZ; $(Sc_2O_3)_x(ZrO_2)_{1-x}$, x=0.05 to 0.15), samarium doped ceria (SDC; $(Sm_2O_3)_x(CeO_2)_{1-x}$, x=0.02 to 0.4), gadolinium doped ceria (GDC; $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

A thickness of the cathode may be 10 μm or more and 100 μm or less. Particularly, the thickness of the cathode may be 20 μm or more and 50 μm or less.

The porosity of the cathode may be 10% or more and 50% or less. Particularly, the porosity of the cathode may be 10% or more and 30% or less.

A diameter of a pore of the cathode may be 0.1 μm or more and 10 μm or less. Particularly, the diameter of the pore of the cathode may be 0.5 μm or more and 5 μm or less. More particularly, the diameter of the cathode may be 0.5 μm or more and 2 μm or less.

In a method for forming a cathode on the other surface of the electrolyte according to the first exemplary embodiment, a cathode may be prepared by coating cathode slurry and drying and firing the coated cathode slurry.

The cathode slurry includes inorganic particles having oxygen ion conductivity, and if necessary, the cathode slurry may further include at least one of a binder resin, a plasticizer, a dispersant, and a solvent. The binder resin, the plasticizer, the dispersant, and the solvent are not particularly limited, and typical materials known in the art can be used.

Based on the total weight of the cathode slurry, the content of the inorganic particle having oxygen ion conductivity may be 40 wt % or more and 70 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

In a method for forming a cathode on the other surface of the electrolyte according to a second embodiment, the cathode may be formed on the electrolyte by infiltrating a precursor solution containing a precursor for synthesizing inorganic particles having oxygen ion conductivity into the other porous surface of the electrolyte by a vacuum solution infiltration method.

For example, a LSCF cathode may be formed on the electrolyte by infiltrating a solution of $La(NO_3)_3 6H_2O$, $Sr(NO_3)_2$, $Co(NO_3)_2 6H_2O$ and $Fe(NO_3)_3 9H_2O$ into the other porous surface of the electrolyte by using vacuum by a vacuum solution infiltration method and then firing. In this case, the firing temperature may be about 1100° C.

In a method for forming a cathode on the other surface of the electrolyte according to a third embodiment, the cathode may be formed on the other surface of the electrolyte by infiltrating an cathode composition into the other porous surface of the electrolyte by a vacuum solution infiltration method. The cathode composition includes inorganic particles which have oxygen ion conductivity, and has viscosity of 1000 cps or less which is infiltratable into the other porous surface of the electrolyte.

The components of the cathode composition are the same as or different from those of the cathode slurry, and although the components are the same as each other, the content of the solvent is increased in order to lower the viscosity and the contents of the components may be different from each other.

The firing of the anode and the cathode may be performed independently or at the same time.

The form of the fuel cell is not limited, and for example, may be a coin type, a plate type, a cylinder type, a horn type, a button type, a sheet type, or a stacked type.

The fuel cell may be particularly used as power of an electric vehicle, a hybrid electric vehicle, a plug-in hybrid electric vehicle or an electric power storage device.

The present specification provides a battery module including the fuel cell as a unit cell.

FIG. 2 schematically illustrates an embodiment of a battery module including a fuel cell, and the fuel cell includes a battery module 60, an oxidizer supply unit 70, and a fuel supply unit 80.

The battery module 60 includes one or more fuel cells described above as unit cells, and when two or more unit cells are included, separators interposed between the unit cells are included. The separator serves to prevent the unit cells from being electrically connected to each other and transmit the fuel and the oxidizer supplied from the outside to the unit cells.

The oxidizer supply unit 70 serves to supply the oxidizer to the battery module 60. As the oxidizer, oxygen is representatively used, and oxygen or air which is injected into the oxidizer supply unit 70 may be used.

The fuel supply unit 80 serves to supply the fuel to the battery module 60 and may include a fuel tank 81 storing the fuel and a pump 82 supplying the fuel stored in the fuel tank 81 to the battery module 60. As the fuel, gas or liquid hydrogen or hydrocarbon fuel may be used. Examples of the hydrocarbon fuel may include methanol, ethanol, propanol, butanol or natural gas.

The present specification provides an electrolyte composition of a solid oxide fuel cell according to the present specification, including oxygen ion conductive inorganic particles and a sintering agent.

The oxygen ion conductive inorganic particles are not particularly limited, but the inorganic particles may include at least one of yttria stabilized zirconia (YSZ; $(Y_2O_3)_x(ZrO_2)_{1-x}$, x=0.05 to 0.15), scandia stabilized zirconia (ScSZ; $(Sc_2O_3)_x(ZrO_2)_{1-x}$, x=0.05 to 0.15), samarium doped ceria (SDC; $(Sm_2O_3)_x(CeO_2)_{1-x}$, x=0.02 to 0.4), gadolinium doped ceria (GDC; $(Gd_2O_3)_x(CeO_2)_{1-x}$, x=0.02 to 0.4), lanthanum strontium manganese oxide (LSM), lanthanum strontium cobalt ferrite (LSCF) lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

An average diameter of the oxygen ion conductive inorganic particles may be 100 nm or more and 500 nm or less.

Based on the total weight of the electrolyte composition, the content of the oxygen ion conductive inorganic particles may be 40 wt % or more and 70 wt % or less.

The sintering agent may include at least one of $SiO_2$, $B_2O_3$, BaO, ZnO, $Al_2O_3$, ZrO, $Na_2O$, $Fe_2O_3$, CaO and $K_2O$, and more preferably $SiO_2$, $B_2O_3$, BaO, ZnO, $Al_2O_3$, ZrO and $Na_2O$.

The sintering agent may include a $ZnO$—$B_2O_3$—$SiO_2$-based glass powder (a glass frit). Particularly, the sintering agent may be a $ZnO$—$B_2O_3$—$SiO_2$-based glass powder.

The $ZnO$—$B_2O_3$—$SiO_2$-based glass powder means a glass powder including ZnO, $B_2O_3$ and $SiO_2$.

In the glass powder, the sum of the weights of ZnO, $B_2O_3$ and $SiO_2$ may be 60 wt % or more and 80 wt % or less based on the total weight of the glass powder.

Based on the total weight of the glass powder, the content of the ZnO may be 5 wt % or more and 50 wt % or less, the content of the $B_2O_3$ may be 5 wt % or more and 30 wt % or less, and the content of the $SiO_2$ may be 30 wt % or more and 50 wt % or less.

The glass powder may further include at least one of Ba oxide, Na oxide, K oxide, Al oxide, Ca oxide, Fe oxide, and Zr oxide. Particularly, the glass powder may further include Ba oxide, Na oxide, K oxide, Al oxide, Ca oxide, Fe oxide, and Zr oxide. More particularly, the glass powder may further include BaO, $Na_2O$, $K_2O$, $Al_2O_3$, CaO, $Fe_2O_3$ and $ZrO_2$.

Based on the total weight of the glass powder, the contents of BaO, $Na_2O$, $K_2O$, $Al_2O_3$, CaO, $Fe_2O_3$ and $ZrO_2$ are not particularly limited and may be included as the remaining amount for the sum of the weights of ZnO, $B_2O_3$ and $SiO_2$.

Based on the total weight of the electrolyte composition, the content of the sintering agent may be more than 0 wt % and 5 wt % or less, specifically 0.2 wt % or more and less than 5 wt %.

The electrolyte composition may further include at least one of a binder resin, a plasticizer, a dispersant and a solvent. The binder resin, the plasticizer, the dispersant, and the solvent are not particularly limited, and typical materials known in the art can be used.

Based on the total weight of the electrolyte composition, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The present specification provides a method for preparing an electrolyte of a solid oxide fuel cell including: forming a membrane by coating a composition; drying the membrane; and sintering the membrane.

In the sintering process, the sintering temperature may be 1200° C. or less and particularly 1000° C. or more and 1200° C. or less.

In the sintering process, the sintering time may be 2 hours or more and 20 hours or less and particularly 3 hours or more and 5 hours or less.

An average thickness of the membrane coated with the composition may be 100 μm or more and 800 μm or less.

Hereinafter, the present specification will be described in more detail through Examples. However, the following Examples are just to exemplify the present specification and the present specification is not limited thereto.

EXAMPLES

Example 1

A support was prepared by laminating six electrolyte (GDC) green sheets with a thickness of 100 μm by using an electrolyte slurry in which 0.5 wt % of a glass powder having the composition in Table 1 and the content (wt %) thereof was added as a sintering agent. After the laminate was cut, sintering was performed on a porous ceramic setter for 3 hours at a final temperature of 1100° C. In this case, the thickness of the electrolyte support after sintering was 520 to 550 μm.

TABLE 1

| SiO2 | B2O3 | BaO | ZnO | Na2O | K2O | Al2O3 | CaO | Fe2O3 | ZrO2 |
|---|---|---|---|---|---|---|---|---|---|
| 46.2399 | 8.3504 | 18.9128 | 9.177 | 8.7248 | 5.7508 | 2.776 | 0.0276 | 0.0232 | 0.0176 |

A vertical cross section of the sintered GDC electrolyte support was measured by a scanning electron microscope (SEM) and an image thereof was illustrated in FIG. 3. According to FIG. 3, it can be seen that when the sintered GDC electrolyte support is divided into five equal parts, the porosity increases toward both surfaces.

In FIG. 3, with respect to SEM images corresponding to FIGS. 3(1) to 3(3), the porosity was measured by a pixel amount for the pores by adjusting a contrast by an image analyzer. As a result, the porosity of FIG. 3(1) was 23%, the porosity of FIG. 3(2) was 9%, and the porosity of FIG. 3(3) was less than 0.1%.

Example 2

An electrolyte support was prepared in the same manner as in Example 1, except that the content of the sintering agent of the electrolytic slurry was 1 wt %. In this case, the thickness of the electrolyte support after sintering was 520 to 550 μm.

A vertical cross section of the sintered GDC electrolyte support was measured by a scanning electron microscope (SEM) and an image thereof was illustrated in FIG. 4. According to FIG. 4, it can be seen that when the sintered GDC electrolyte support is divided into five equal parts, the porosity increases toward both surfaces.

In FIG. 4, with respect to the SEM images corresponding to FIGS. 4(1) to 4(3), the porosity was measured by a pixel amount for the pores by adjusting a contrast by an image analyzer. As a result, the porosity of FIG. 4(1) was 21%, the porosity of FIG. 4(2) was 5%, and the porosity of FIG. 4(3) was less than 0.1%.

Comparative Example 1

An electrolyte support was prepared in the same manner as in Example 1, except that electrolytic slurry without a sintering agent (the content of the sintering agent was 0 wt %) was used.

A vertical cross section of the sintered GDC electrolyte support was measured by a scanning electron microscope (SEM) and an image thereof was illustrated in FIG. 5.

Comparative Example 2

An electrolyte support was prepared in the same manner as in Example 1, except that the content of the sintering agent of the electrolytic slurry was 0.1 wt %.

A vertical cross section of the sintered GDC electrolyte support was measured by a scanning electron microscope (SEM) and an image thereof was illustrated in FIG. 6.

Comparative Example 3

An electrolyte support was prepared in the same manner as in Example 1, except that the content of the sintering agent of the electrolytic slurry was 5 wt %.
A vertical cross section of the sintered GDC electrolyte support was measured by a scanning electron microscope (SEM) and an image thereof was illustrated in FIG. 7.

Comparative Example 4

An electrolyte support was prepared in the same manner as in Example 1, except that the content of the sintering agent of the electrolytic slurry was 10 wt %.
A vertical cross section of the sintered GDC electrolyte support was measured by a scanning electron microscope (SEM) and an image thereof was illustrated in FIG. 8.

Comparative Example 5

An electrolyte support without a sintering agent was prepared in the same manner as in Comparative Example 1, except that the sintering temperature was 1200° C.
A vertical cross section of the sintered GDC electrolyte support was measured by a scanning electron microscope (SEM) and an image thereof was illustrated in FIG. 9.

Comparative Example 6

An electrolyte support without a sintering agent was prepared in the same manner as in Comparative Example 1, except that the sintering temperature was 1400° C.
A vertical cross section of the sintered GDC electrolyte support was measured by a scanning electron microscope (SEM) and an image thereof was illustrated in FIG. 10.

Comparative Example 7

An electrolyte support without a sintering agent was prepared in the same manner as in Comparative Example 1, except that the sintering temperature was 1450° C.
A vertical cross section of the sintered GDC electrolyte support was measured by a scanning electron microscope (SEM) and an image thereof was illustrated in FIG. 11.

Comparative Example 8

An electrolyte support without a sintering agent was prepared in the same manner as in Comparative Example 1, except that the sintering temperature was 1500° C.
A vertical cross section of the sintered GDC electrolyte support was measured by a scanning electron microscope (SEM) and an image thereof was illustrated in FIG. 12.

Experimental Example 1

Measurement of Scanning Electron Microscope
The vertical cross sections of the electrolytes of Examples 1 and 2 and Comparative Examples 1 to 8 were measured by a scanning electron microscope and illustrated in FIGS. 3 to 12, respectively.

As a result, it can be seen that in the electrolyte supports of Examples 1 and 2, the middle portions were dense and the pores gradually increased toward the both surfaces. In addition, it can be seen that the electrolyte supports of Comparative Examples 1 to 8 had a sintering structure in which the middle portions and both surfaces of the electrolyte supports were uniformly the same as each other.

The invention claimed is:

1. An electrolyte of a solid oxide fuel cell, said electrolyte comprising:
a first surface;
a second surface opposite the first surface; and
a middle portion present between the first and second surface,
wherein porosity gradually increases in a thickness direction from the middle portion to both the first surface and the second surface;
wherein the electrolyte further comprises oxygen ion conductive inorganic particles;
wherein the electrolyte further comprises a sintering agent in an amount of 0.2 wt % or more and less than 5 wt % based on the total weight of the electrolyte composition;
wherein the sintering agent includes a $ZnO$—$B_2O_3$—$SiO_2$-based glass powder including $SiO_2$, $B_2O_3$, $BaO$, $ZnO$, $CaO$, $Fe_2O_3$, $K_2O$, $Al_2O_3$, $ZrO_2$, and $Na_2O$;
wherein in the glass powder, the sum of the weights of $ZnO$, $B_2O_3$ and $SiO_2$ is 60 wt % or more and 80 wt % or less based on the total weight of the glass powder; and
wherein based on the total weight of the glass powder, the content of the $ZnO$ is 5 wt % or more and 50 wt % or less, the content of the $B_2O_3$ is 5 wt % or more and 30 wt % or less, and the content of the $SiO_2$ is 30 wt % or more and 50 wt % or less.

2. The electrolyte of claim 1, wherein the porosity of each of the first surface and the second surface of the electrolyte is higher than the porosity of the middle portion of the electrolyte by 20% or more.

3. The electrolyte of claim 1, wherein the porosity of the middle portion of the electrolyte is less than 0.1%.

4. The electrolyte of claim 1, wherein the porosity of both the first surface and the second surface of the electrolyte is 20% or more, respectively.

5. The electrolyte of claim 1, wherein an average thickness of the electrolyte is 300 μm or more and 1000 μm or less.

6. A solid oxide fuel cell, comprising:
an anode;
a cathode; and
the electrolyte of claim 1 provided between the anode and the cathode.

7. The solid oxide fuel cell of claim 6, wherein the electrolyte is an electrolyte support.

8. The electrolyte of claim 1, said electrolyte comprising an electrolyte composition comprising:
the oxygen ion conductive inorganic particles; and
the sintering agent,
wherein based on the total weight of the composition, the content of the sintering agent is 0.2 wt % or more and less than 5 wt %.

* * * * *